US009092059B2

(12) United States Patent
Bhatia

(10) Patent No.: US 9,092,059 B2
(45) Date of Patent: *Jul. 28, 2015

(54) STREAM-INDEPENDENT SOUND TO HAPTIC EFFECT CONVERSION SYSTEM

(71) Applicant: Immersion Corporation, San Jose, CA (US)

(72) Inventor: Satvir Singh Bhatia, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/661,140

(22) Filed: Oct. 26, 2012

(65) Prior Publication Data

US 2014/0118125 A1 May 1, 2014

(51) Int. Cl.
*G08B 6/00* (2006.01)
*G06F 3/01* (2006.01)

(52) U.S. Cl.
CPC ............... *G06F 3/016* (2013.01); *G06F 3/017* (2013.01); *G08B 6/00* (2013.01)

(58) Field of Classification Search
CPC ........................................................ G08B 6/00
USPC ................ 340/407.1; 704/235; 345/156, 173; 700/94; 710/6, 58
See application file for complete search history.

(56) References Cited

U.S. PATENT DOCUMENTS

| | | |
|---|---|---|
| 5,675,709 A | 10/1997 | Chiba |
| 5,684,722 A | 11/1997 | Thorner et al. |
| 5,842,163 A | 11/1998 | Weintraub |
| 6,183,367 B1 | 2/2001 | Kaji et al. |
| 6,285,351 B1 | 9/2001 | Chang et al. |
| 6,422,941 B1 | 7/2002 | Thorner et al. |
| 7,091,948 B2 | 8/2006 | Chang et al. |
| 7,623,114 B2 | 11/2009 | Rank |
| 7,979,146 B2 | 7/2011 | Ullrich et al. |
| 8,000,825 B2 | 8/2011 | Ullrich et al. |

(Continued)

FOREIGN PATENT DOCUMENTS

| | | |
|---|---|---|
| EP | 0144774 A2 | 6/1985 |
| EP | 2487557 A2 | 8/2012 |

(Continued)

OTHER PUBLICATIONS

Tony Fisher, "Butterworth/Bessel/Chebyshev Filters," http://www-users.cs.york.ac.uk/~fisher/mkfilter/trad.html (last visited Jan. 29, 2012).

(Continued)

*Primary Examiner* — Brent Swarthout
(74) *Attorney, Agent, or Firm* — Miles & Stockbridge P.C.

(57) ABSTRACT

A haptic conversion system is provided that receives a plurality of audio streams of an audio signal. The haptic conversion system further determines, for each stream of the plurality of streams, whether at least one parameter of the one or more parameters indicates that the corresponding stream is to be converted into a haptic effect, and thus, identifies one or more streams that include at least one parameter that indicates the corresponding stream is to be converted into the haptic effect. The haptic conversion system further generates, for the identified streams, a haptic signal based on each corresponding stream. The haptic conversion system further sends, for the identified streams, each haptic signal to an actuator to generate a haptic effect.

23 Claims, 4 Drawing Sheets

(56) References Cited

U.S. PATENT DOCUMENTS

| | | |
|---|---|---|
| 8,378,964 B2 | 2/2013 | Ullrich et al. |
| 8,717,152 B2 | 5/2014 | Bhatia et al. |
| 2003/0067440 A1 | 4/2003 | Rank |
| 2005/0134561 A1 | 6/2005 | Tierling et al. |
| 2007/0079138 A1 | 4/2007 | Chou |
| 2007/0236449 A1 | 10/2007 | Lacroix et al. |
| 2009/0002315 A1 | 1/2009 | Chu |
| 2009/0009481 A1 | 1/2009 | Yatsu et al. |
| 2009/0231276 A1 | 9/2009 | Ullrich et al. |
| 2010/0066512 A1 | 3/2010 | Rank |
| 2010/0156818 A1 | 6/2010 | Burrough et al. |
| 2010/0287311 A1 | 11/2010 | Cruz-Hernandez et al. |
| 2011/0102160 A1 | 5/2011 | Heubel et al. |
| 2011/0102161 A1 | 5/2011 | Heubel et al. |
| 2011/0115709 A1 | 5/2011 | Cruz-Hernandez |
| 2011/0128132 A1 | 6/2011 | Ullrich et al. |
| 2011/0202155 A1 | 8/2011 | Ullrich et al. |
| 2011/0215913 A1 | 9/2011 | Ullrich et al. |
| 2012/0206247 A1 | 8/2012 | Bhatia et al. |
| 2012/0306631 A1 | 12/2012 | Hughes |
| 2013/0088339 A1* | 4/2013 | Lim et al. .................. 340/407.1 |
| 2013/0131851 A1 | 5/2013 | Ullrich et al. |
| 2013/0207917 A1 | 8/2013 | Cruz-Hernandez et al. |

FOREIGN PATENT DOCUMENTS

| | | |
|---|---|---|
| WO | 9609617 A1 | 3/1996 |
| WO | 03032289 A1 | 4/2003 |
| WO | 2010104953 A1 | 9/2010 |

OTHER PUBLICATIONS

Henry Da Costa et al., U.S. Appl. No. 13/439,241, filed Apr. 4, 2012.

Juan Manuel Cruz-Hernandez et al., U.S. Appl. No. 13/365,984, filed Feb. 3, 2012.

Satvir Singh Bhatia et al., U.S. Appl. No. 13/366,010, filed Feb. 3, 2012.

* cited by examiner

STREAM-INDEPENDENT SOUND TO HAPTIC EFFECT CONVERSION SYSTEM

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Such devices can also be configured to play audio data, such as a digital audio signal. For example, such devices can include applications configured to play video data, such as a movie or video game, that contains an audio portion, or audio data, such as a song. Similar to haptics, calls to additional embedded hardware capable of generating audio effects (such as speakers) can be programmed within the OS of the device. Thus, the OS of the device can send a play command through control circuitry to the additional embedded hardware, where the additional embedded hardware then produces the appropriate audio effect.

SUMMARY

One embodiment is a system that converts one or more streams of an audio signal into one or more haptic effects. The system receives a stream of the audio signal, where the stream includes one or more parameters. The system further determines whether at least one parameter of the one or more parameters indicates that the stream is to be converted into a haptic effect. The system further generates a haptic signal based on the stream when the at least one parameter indicates that the stream is to be converted into the haptic effect. The system further sends the haptic signal to an actuator to generate the haptic effect when the at least one parameter indicates that the stream is to be converted into the haptic effect.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic conversion system that can receive an audio signal that includes a plurality of audio streams, identify which audio streams of the plurality of audio streams are to be converted into haptic effects based on one or more parameters included within each audio stream, generate a haptic signal for each identified audio stream, and play the generated haptic signals through one or more actuators to produce one or more haptic effects. The haptic conversion system can generate a haptic signal for only the identified audio streams, and thus, can provide stream-independent control of haptic conversion. Thus, by assigning one or more parameters to each audio stream of an audio signal, a user of the haptic conversion system can turn on, or turn off, audio-to-haptic conversion for each audio stream of an audio signal. Further, the haptic conversion system can configure each haptic signal generated for each individual audio stream based on the one or more parameters included within each audio stream. The configuring of each haptic signal can occur before, during, or after audio-to-haptic conversion. Therefore, by assigning one or more parameters to each audio stream of the audio signal, the user of the haptic conversion system can individually configure the audio-to-haptic conversion for each individual audio stream by individually configuring the haptic signal that is generated for the corresponding audio stream. In an embodiment where the generated signals are played through a plurality of actuators, the one or more parameters can include at least one actuator parameter that can configure the generated signal to be played through one or more specified actuators.

Figure 1:
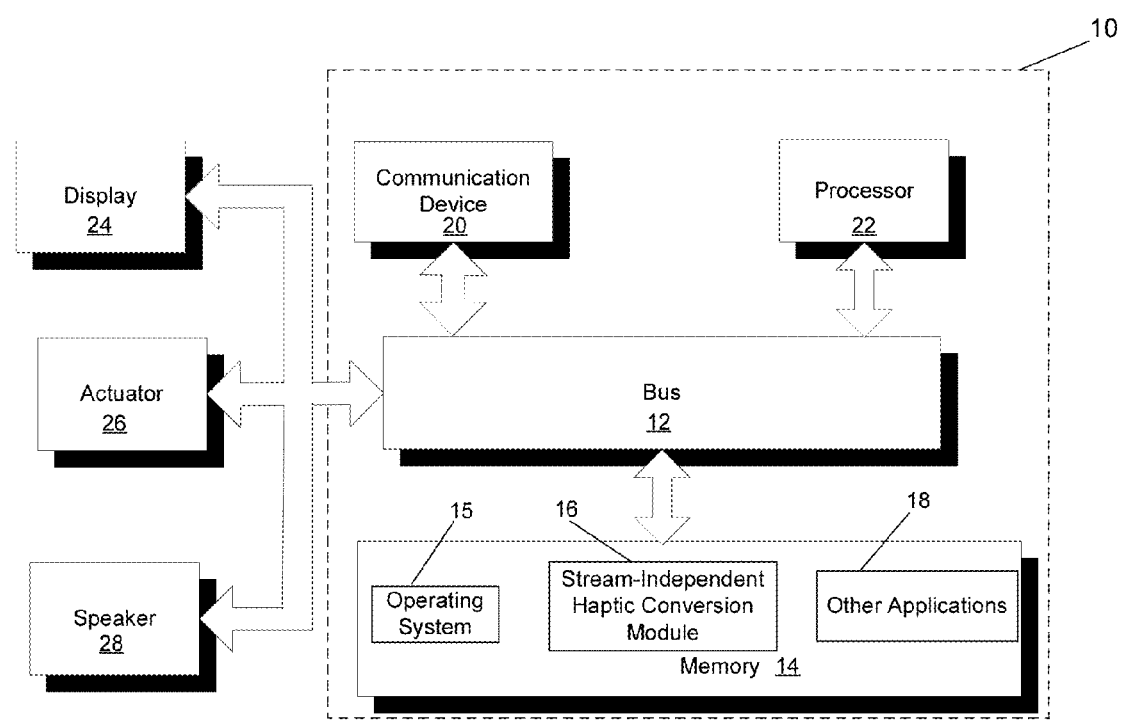
FIG. 1 illustrates a block diagram of a haptic feedback system in accordance with one embodiment of the invention.

FIG. 1 illustrates a block diagram of a haptic conversion system 10 in accordance with one embodiment of the invention. In one embodiment, system 10 is part of a device, and system 10 provides a haptic conversion functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a stream-independent haptic conversion module 16 that converts one or more audio streams of an audio signal into one or more haptic signals that are used to produce one or more haptic effects, as disclosed in more detail below. In certain embodiments, stream-independent haptic conversion module 16 can comprise a plurality of modules, where each individual module provides specific individual functionality for converting one or more audio streams of an audio signal into one or more haptic signals that are used to produce one or more haptic effects. System 10 will typically include one or more additional application modules 18 to include additional functionality, such as various mobile applications available for mobile devices.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen.

System 10, in one embodiment, further includes an actuator 26. Processor 22 may transmit a haptic signal associated with a generated haptic effect to actuator 26, which in turn outputs haptic effects such as vibrotactile haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). In other embodiments, a separate device from system 10 includes an actuator that generates the haptic effects, and haptic feedback system 10 sends generated haptic effect signals to that device through communication device 20.

In some embodiments, system 10 further includes one or more speakers 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, or a digital loudspeaker.

Figure 2:
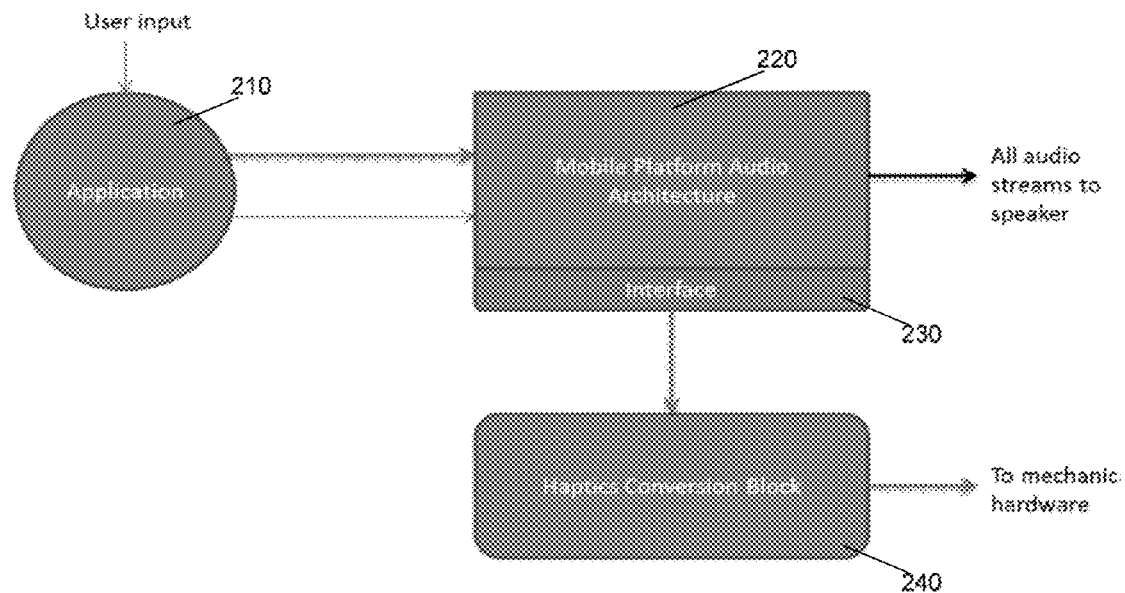
FIG. 2 illustrates an architecture diagram of a haptic conversion system, according to one embodiment of the invention.

FIG. 2 illustrates an architecture diagram of a haptic conversion system, according to one embodiment of the invention. In the illustrated embodiment, the haptic conversion system includes an application 210, a mobile platform audio architecture 220, an interface 230, and a haptics conversion block 240. Application 210 is a software application that can be executed on a device (such as a mobile device), and that is configured to generate an audio signal. In the illustrated embodiment, application 210 receives user input, and generates an audio signal in response to the user input, where the audio signal includes one or more audio streams.

In certain embodiments, the audio signal is a digital audio signal, such as a pulse-code modulation ("PCM") audio signal, where the PCM audio signal includes one or more PCM audio streams. In other embodiments, the audio signal is a structure-based audio signal, such as a Musical Instrument Digital Interface ("MIDI") audio signal, where the MIDI audio signal includes one or more MIDI audio streams. In yet other embodiments, the audio signal is a frequency domain audio signal, such as an MPEG-2 Audio Layer III ("MP3") audio signal, where the MP3 audio signal includes one or more MP3 audio streams. In yet other embodiments, the audio signal is another audio format, having multiple audio streams, that is known to one of ordinary skill in the art.

Each audio stream of the audio signal can include one or more parameters. As is described below in greater detail, the one or more parameters can be used by interface 230 to customize processing of each audio stream of the audio signal. The one or more parameters can include a haptic conversion indication parameter. The haptic conversion indication parameter can indicate whether the corresponding audio stream is to be converted into a haptic effect, as is described below in greater detail. The one or more parameters can also include one or more haptic parameters. The one or more haptic parameters can be used to configure a haptic signal that is generated based on the audio stream, and thus, can be used to configure the haptic effect that is generated based on the audio stream, as is also described below in greater detail. The configuring of the haptic signal can occur before, during, or after the generation of the haptic signal. Each of the one or more haptic parameters can include a value, where each value corresponds to each of the one or more haptic parameters. Examples of such haptic parameters include a strength parameter (which can be used to configure a strength of a haptic signal), a density parameter (which can be used to configure a density of a haptic signal), a magnitude parameter (which can be used to configure a magnitude of a haptic signal), a frequency parameter (which can be used to configure a frequency of a haptic signal), an actuator parameter (which can be used to configure a haptic signal to be sent to one or more specified actuators), or a fail-safe parameter (which can be used to indicate a fail-safe operation to execute in a case of one or more invalid haptic parameters).

In the illustrated embodiment, application 210 sends the one or more audio streams of the audio signal to mobile platform audio architecture 220 via interface 230. Mobile platform audio architecture 220 is a module (or a collection of modules) configured to send the one or more audio streams of the audio signal to one or more speakers (not illustrated in FIG. 2). Mobile platform audio architecture 220 can include one or more application programming interfaces ("APIs") that can provide functionality for streaming one or more audio streams of an audio signal to one or more speakers. In one embodiment, mobile platform audio architecture 220 is an Android AudioTrack module (or collection of modules) of an Android® operating system for a mobile device. In this embodiment, mobile platform audio architecture 220 can include one or more AudioTrack APIs, where each AudioTrack API can represent a different audio stream of an audio signal that application 210 is configured to play, and where each AudioTrack API can be called (or executed) in order to play the audio stream at one or more speakers. In the illustrated embodiment, each AudioTrack API can be called by a corresponding API within interface 230, as is described below in greater detail. When each AudioTrack API is called, each AudioTrack API can be passed an audio stream of the audio signal played by application 210, and each AudioTrack API can play the corresponding audio stream at one or more speakers. Thus, in the illustrated embodiment, mobile platform audio architecture 220 receives the one or more audio streams of the audio signal sent by application 210 and sends them to the one or more speakers.

Interface 230 is a module (or a collection of modules) configured to extend mobile platform audio architecture 220 and provide functionality for: (a) determining which audio streams of the audio signal utilize audio-to-haptic conversion; and (b) configuring audio-to-haptic conversion for each audio stream that utilizes audio-to-haptic conversion. According to the embodiment, APIs within interface 230 are at a higher level of abstraction than APIs within either mobile platform audio architecture 220 or haptic conversion block 240. This is because an API within interface 230 can call an API within mobile platform audio architecture 220 and/or an API within haptic conversion block 240 based on one or more parameters included within an audio stream of an audio signal. In one embodiment, interface 230 can include one or more APIs (identified as HapticTrack APIs), where each HapticTrack API of interface 230 can represent an audio stream of an audio signal that application 210 is configured to play, and where each HapticTrack API of interface 230 corresponds to an API within mobile platform audio architecture 220 (such as an AudioTrack API). According to the embodiment, each HapticTrack API can be called by application 210 in order to play an audio stream at one or more speakers, and, potentially, to convert the audio stream into a haptic signal, and to play the haptic signal at one or more actuators (not illustrated in FIG. 2) to generate one or more haptic effects.

When application 210 calls a HapticTrack API of interface 230, according to one embodiment, application 210 passes an audio stream of the audio signal, where the audio stream includes one or more parameters. One of the parameters can be a haptic conversion indication parameter. As previously described, a haptic conversion indication parameter can indicate whether the corresponding audio stream is to be converted into a haptic effect.

According to the embodiment, the HapticTrack API of interface 230 can call the corresponding AudioTrack API of mobile platform audio architecture 220, and pass the audio stream to the corresponding AudioTrack API. The AudioTrack API can then play the audio stream at one or more speakers as previously described. The HapticTrack API can also analyze the one or more parameters and determine whether the haptic conversion indication parameter includes a value that indicates that the audio stream is to be converted into a haptic effect. If the haptic conversion indication parameter does include a value that indicates that the audio stream is to be converted into a haptic effect, the HapticTrack API can call haptics conversion block 240 to convert the audio stream into a haptic effect, as is described below in greater detail. If the haptic conversion indication parameter does not include a value that indicates that the audio stream is to be converted into the haptic effect, the HapticTrack API does not call haptics conversion block 240, and the audio stream is not converted into a haptic effect.

In certain embodiments, interface 230 is an interface that can be operably coupled to mobile platform audio architecture 220, and that can determine if an audio stream is to be converted into a haptic effect. In some of these embodiments, interface 230 can also configure how the audio stream is to be converted into the haptic effect. In some of these embodiments, the configuration can include determining which actuator to send a haptic signal that represents the haptic effect, in order to generate the haptic effect.

Further, in some embodiments, interface 230 can also perform error detection on the one or more parameters included within the audio stream. For example, interface 230 can determine whether one or more of the parameters are invalid (e.g., one or more of the parameters includes a value that is invalid). Examples of an invalid value for a parameter can include a value for a strength parameter that is outside of a pre-defined range, or a value for an actuator parameter that represents a non-existent actuator. In the scenario that interface 230 determines that one or more of the parameters are invalid, interface 230 can execute a fail-safe operation for converting the audio stream into a haptic effect. An example fail-safe operation is to use a default audio-to-haptic conversion process. Another example fail-safe operation is to automatically bypass any audio-to-haptic conversion of the audio stream. In one embodiment, interface 230 can select the fail-safe operation to execute based on a fail-safe parameter included within the audio stream.

Thus, in one embodiment, interface 230 provides a comprehensive interpretation of one or more parameters included within an audio stream. According to the embodiment, there can be a finite number of combinations of the one or more parameters, and a different HapticTrack API can be called depending on a number and type of parameters included within the audio stream. Also, in one embodiment, the one or more parameters can be an extension of one or more audio parameters that can be sent to an AudioTrack API. Thus, any audio stream (including any combination of parameters) that can be sent to an AudioTrack API can also be sent to a HapticTrack API. In one embodiment, the one or more parameters can include one or more audio parameters and one or more additional parameters. In the embodiment, interface 230 can be responsible for interpreting the one or more parameters to determine one or more operations to be performed on the audio stream.

Haptics conversion block 240 is a module (or a collection of modules) that is configured to receive an audio stream, convert the audio stream into a haptic signal, and play the haptic signal at one or more actuators to generate one or more haptic effects. Further details of the audio-to-haptic conversion processing performed by haptic conversion block 240 are described in U.S. application Ser. No. 13/365,984, "SOUND TO HAPTIC EFFECT CONVERSION SYSTEM USING AMPLITUDE VALUE," the disclosure of which is incorporated by reference herein, U.S. application Ser. No. 13/366,010, "SOUND TO HAPTIC EFFECT CONVERSION SYSTEM USING WAVEFORM," the disclosure of which is also incorporated by reference herein, and U.S. application Ser. No. 13/439,241, "SOUND TO HAPTIC EFFECT CONVERSION SYSTEM USING MULTIPLE ACTUATORS," the disclosure of which is also incorporated by reference herein.

In certain embodiments, haptic conversion block 240 is only called for audio streams that include a haptic conversion indication parameter that indicates that the audio stream is to be converted into a haptic effect. In these embodiments, because haptic conversion block 240 is only called for each audio stream that includes a haptic conversion indication parameter that indicates that the audio stream is to be converted into a haptic effect, haptic conversion block 240 only converts these specific audio streams into haptic signals that are subsequently played at one or more actuators. Any audio streams that do not include such a haptic conversion indication parameter (or any audio streams that include a haptic conversion indication parameter, but the haptic conversion indication parameter indicates that the audio stream is not to be converted into a haptic effect) are not converted into haptic signals by haptic conversion block 240, according to these embodiments. In other embodiments, haptic conversion block 240 can only be called for audio streams that include one or more parameters that either expressly or contextually indicate that the audio stream is to be converted into a haptic effect. By expressly indicating that the audio stream is to be converted into a haptic effect, the one or more parameters include specific values that indicate that the audio stream is to be converted into a haptic effect. By contextually indicating that the audio stream is to be converted into a haptic effect, the one or more parameters do not necessarily include specific values that indicate that the audio stream is to be converted into a haptic effect, but the presence of the one or more parameters implies that the audio stream is to be converted into a haptic effect.

In certain embodiments, a HapticTrack API of interface 230 can further analyze the one or more parameters and determine whether the one or more parameters include one or more haptic parameters. In certain embodiments, each of the one or more haptic parameters can include a value, where each value corresponds to each of the one or more haptic parameters. If the one or more parameters do include one or more haptic parameters, the HapticTrack API can use the one or more haptic parameters to configure a haptic signal that is generated by haptic conversion block 240. In certain embodiments, the HapticTrack API can use the one or more values that correspond to the one or more haptic parameters to configure the haptic signal that is generated by haptic conversion block 240. The configuration of the haptic signal can, thus, configure the haptic effect that is generated at one or more actuators. For example, if one of the haptic parameters is a strength parameter, the HapticTrack API can configure a strength of the haptic signal generated by haptic conversion block 240 based on the value of the strength parameter. This configuration can configure a strength of the corresponding haptic effect. As another example, if one of the haptic parameters is a density parameter, the HapticTrack API can configure a density of the haptic signal generated by haptic conversion block 240 based on the value of the density parameter. This configuration can configure a density of the corresponding haptic effect. As yet another example, if one of the haptic parameters is a magnitude parameter, the HapticTrack API can configure a magnitude of the haptic signal generated by haptic conversion block 240 based on the value of the magnitude parameter. This configuration can configure a magnitude of the corresponding haptic effect. As another example, if one of the haptic parameters is a frequency parameter, the HapticTrack API can configure a frequency of the haptic signal generated by the haptic conversion block 240 based on the value of the frequency parameter. This configuration can configure a frequency of the corresponding haptic effect. As yet another example, if one of the haptic parameters is an actuator parameter, the HapticTrack API can configure the haptic signal generated by the haptic conversion block 240 to be sent to one or more specific actuators based on the value of the actuator parameter. This configuration can configure the corresponding haptic effect by causing the corresponding haptic effect to be generated by the specific one or more actuators. In one embodiment, the value of the actuator parameter can be an array of actuator indices, where each actuator index represents a specific actuator of the one or more actuators. As yet another example, if one of the haptic parameters is a fail-safe parameter, the HapticTrack API can configure the haptic signal based on a fail-safe operation indicated by the fail-safe parameter in the event that at least one of the haptic parameters is invalid. In some of these embodiments, the HapticTrack API can configure the haptic signal before the haptic signal is generated by haptic conversion block 240. In these embodiments, the HapticTrack API uses the values of the one or more parameters to configure the one or more characteristics used by haptic conversion block 240 to generate the haptic signal. In some of these embodiments, the audio stream can be manipulated so that the corresponding haptic signal will include characteristics requested by the one or more parameters. In other embodiments, the HapticTrack API can configure the haptic signal while the haptic signal is being generated by haptic conversion block 240. In some of these embodiments, while generating the haptic signal the one or more parameters are considered in generating a final haptic signal. In other embodiments, the HapticTrack API can configure the haptic signal after the haptic signal is generated by haptic conversion block 240. In some of these embodiments, after first generating the haptic signal, the haptic signal can be manipulated so that it includes characteristics requested by the one or more parameters.

The configuration of haptic effects can be useful to a haptic effect developer who designs haptic effects that are to be played in conjunction with audio effects. For example, a haptic effect developer that is developing haptic effects to be played within a computer game can signify an explosion within the computer game by causing one or more audio streams of an audio signal representing an explosion to include haptic parameters with maximum values, so that the resulting haptic effect is strong. As another example, a haptic effect developer can signify footsteps within the computer game by causing one or more audio streams of an audio signal representing the footsteps to include haptic parameters with reduced values, so that the resulting haptic effect is different from the haptic effect that represents an explosion.

Figure 3:
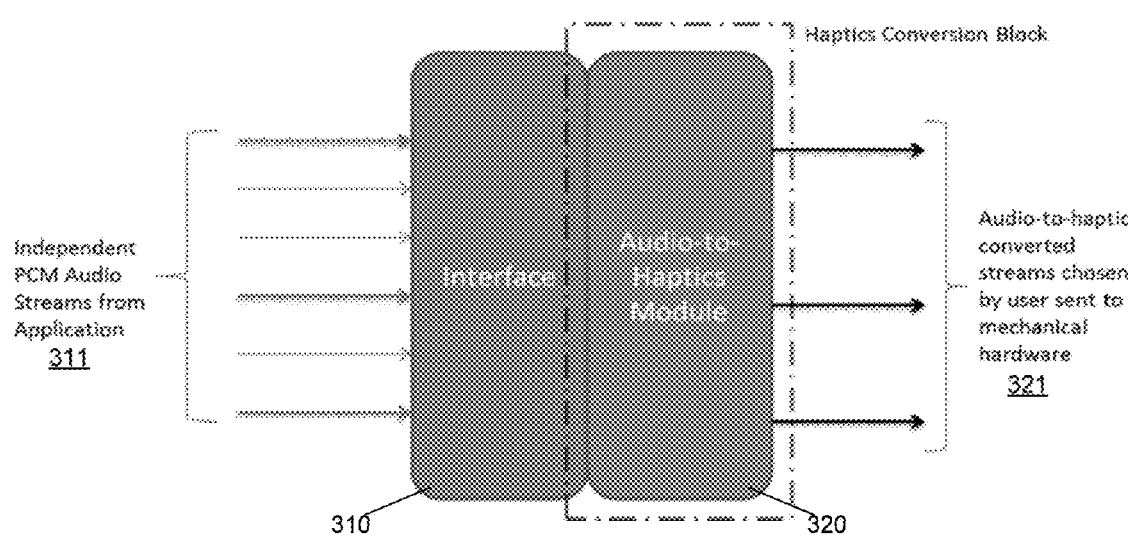
FIG. 3 illustrates an example of a haptic conversion system that receives a plurality of audio streams of an audio signal and selectively converts specific audio streams into haptic signals that are sent to an actuator to output one or more haptic effects, according to one embodiment of the invention.

FIG. 3 illustrates an example of a haptic conversion system that receives a plurality of audio streams of an audio signal and selectively converts specific audio streams into haptic signals that are sent to an actuator to output one or more haptic effects, according to one embodiment of the invention. According to the embodiment, the haptic conversion system includes interface 310 and audio-to-haptics module 320. Interface 310 is a module (or a collection of modules) configured to provide functionality for: (a) determining which audio streams of an audio signal utilize audio-to-haptic conversion; and (b) configuring audio-to-haptic conversion for each audio stream that utilizes audio-to-haptic conversion. In some embodiments, interface 310 is identical to interface 230 of FIG. 2.

According to the embodiment, interface 310 receives a plurality of audio streams of an audio signal (illustrated in FIG. 3 as audio streams 311), where each audio stream includes one or more parameters. In certain embodiments, the audio signal is a digital audio signal, such as a PCM audio signal, and the plurality of audio streams of the PCM audio signal is a plurality of PCM audio streams. For each audio stream, interface 310 determines whether at least one parameter included within the audio stream is a haptic conversion indication parameter that includes a value that indicates that the audio stream is to be converted into a haptic effect. In certain embodiments, interface 310 makes this determination when the audio stream includes a haptic conversion indication parameter that indicates that the audio stream is to be converted into a haptic effect. In other embodiments, interface 310 makes this determination when the audio stream includes one or more parameters that either expressly or contextually indicate that the audio stream is to be converted into a haptic effect. By expressly indicating that the audio stream is to be converted into a haptic effect, the one or more parameters include specific values that indicate that the audio stream is to be converted into a haptic effect. By contextually indicating that the audio stream is to be converted into a haptic effect, the one or more parameters do not necessarily include specific values that indicate that the audio stream is to be converted into a haptic effect, but the presence of the one or more parameters implies that the audio stream is to be converted into a haptic effect.

Thus, interface 310 identifies one or more audio streams that include a haptic conversion indication parameter that indicates that the corresponding audio stream is to be converted into a haptic effect. Interface 310 subsequently sends these identified audio streams to audio-to-haptics module 320. According to the embodiment, interface 310 does not send the other audio streams (i.e., the audio streams that do not include a haptic conversion indication parameter that indicates that the corresponding audio stream is to be converted into a haptic effect, or the audio streams that include a haptic conversion indication parameter, but the haptic conversion indication parameter indicates that the audio stream is not to be converted into a haptic effect) to audio-to-haptics module 320. Thus, interface 310 sets up audio-to-haptic module 320 and instructs audio-to-haptic module on how to process the audio stream that interface 310 sends to audio-to-haptic module 320.

In the illustrated embodiment, three audio streams of audio streams 311 (as indicated by thicker lines illustrated in FIG. 3) include a haptic conversion indication parameter that indicates that the corresponding audio stream is to be converted into a haptic effect. Further, three other audio streams of audio streams 311 do not include a haptic conversion indication parameter that indicates that the corresponding audio stream is to be converted into a haptic effect. Thus, in the illustrated embodiment, interface 310 identifies the three audio streams of audio streams 311 that include a haptic conversion indication parameter that indicates that the corresponding audio stream is to be converted into a haptic effect, and only send those three audio streams to audio-to-haptics module 320. Further, audio-to-haptics module 320 only converts those three audio streams into haptic signals, and audio-to-haptic module 320 only sends three haptic signals to an actuator. However, the illustrated embodiment is only an example embodiment, interface 310 can be configured to identify and send any number of audio streams to audio-to-haptics module 320, and audio-to-haptics module 320 can be configured to convert any number of audio streams to any number of haptic signals, and send any number of haptic signals to any number of actuators.

Audio-to-haptics module 320 is a module (or a collection of modules) that is configured to receive an audio stream, convert the audio stream into a haptic signal, and play the haptic signal at one or more actuators to generate one or more haptic effects. In some embodiments, audio-to-haptics module 320 is identical to haptic conversion block 240 of FIG. 2. In the embodiment, audio-to-haptics module 320 is configured to receive the one or more audio streams from interface 310, and generate a corresponding haptic signal for each audio stream. Audio-to-haptics module 320 is further configured to send the one or more haptic signals to one or more actuators (illustrated in FIG. 3 as haptic signals 321), where the one or more haptic signals are played at the one or more actuators to generate the one or more haptic effects. In certain embodiments, for each audio stream that interface 310 sends to audio-to-haptics module 320, interface 310 further configures the haptic signal generated by audio-to-haptics module 320 based on the one or more parameters included within the corresponding audio stream. The configuration of the haptic signal can, thus, configure the haptic effect that is generated at one or more actuators.

For example, if one of the haptic parameters is a strength parameter, interface 310 can configure a strength of the haptic signal generated by audio-to-haptics module 320 based on the value of the strength parameter. This configuration can configure a strength of the corresponding haptic effect. As another example, if one of the haptic parameters is a density parameter, interface 310 can configure a density of the haptic signal generated by audio-to-haptics module 320 based on the value of the density parameter. This configuration can configure a density of the corresponding haptic effect. As yet another example, if one of the haptic parameters is a magnitude parameter, interface 310 can configure a magnitude of the haptic signal generated by audio-to-haptics module 320 based on the value of the magnitude parameter. This configuration can configure a magnitude of the corresponding haptic effect. As another example, if one of the haptic parameters is a frequency parameter, interface 310 can configure a frequency of the haptic signal generated by audio-to-haptics module 320 based on the value of the frequency parameter. As yet another example, if one of the haptic parameters is an actuator parameter, interface 310 can configure the haptic signal generated by audio-to-haptics module 320 to be sent to one or more specific actuators based on the value of the actuator parameter. In one embodiment, the value of the actuator parameter can be an array of actuator indices, where each actuator index represents a specific actuator of the one or more actuators. As yet another example, if one of the haptic parameters is a fail-safe parameter, and if at least one of the haptic parameters is invalid, the HapticTrack API can configure the haptic signal based on a fail-safe operation indicated by the fail-safe parameter. In some embodiments, interface 310 can configure the haptic signal before audio-to-haptics module 320 generates the haptic signal. In these embodiments, interface 310 uses the values of the one or more parameters to configure the one or more characteristics used by audio-to-haptics module 320 to generate the haptic signal. In some of these embodiments, the audio stream can be manipulated so that the corresponding haptic signal will include characteristics requested by the one or more parameters. In some other embodiments, interface 310 can configure the haptic signal while audio-to-haptics module 320 generates the haptic signal. In some of these embodiments, while generating the haptic signal the one or more parameters are considered in generating the ultimate haptic signal. In some other embodiments, interface 310 can configure the haptic signal after audio-to-haptics module 320 generates the haptic signal. In some of these embodiments, after first generating the haptic signal, the haptic signal can be manipulated so that it includes characteristics requested by the one or more parameters.

Figure 4:
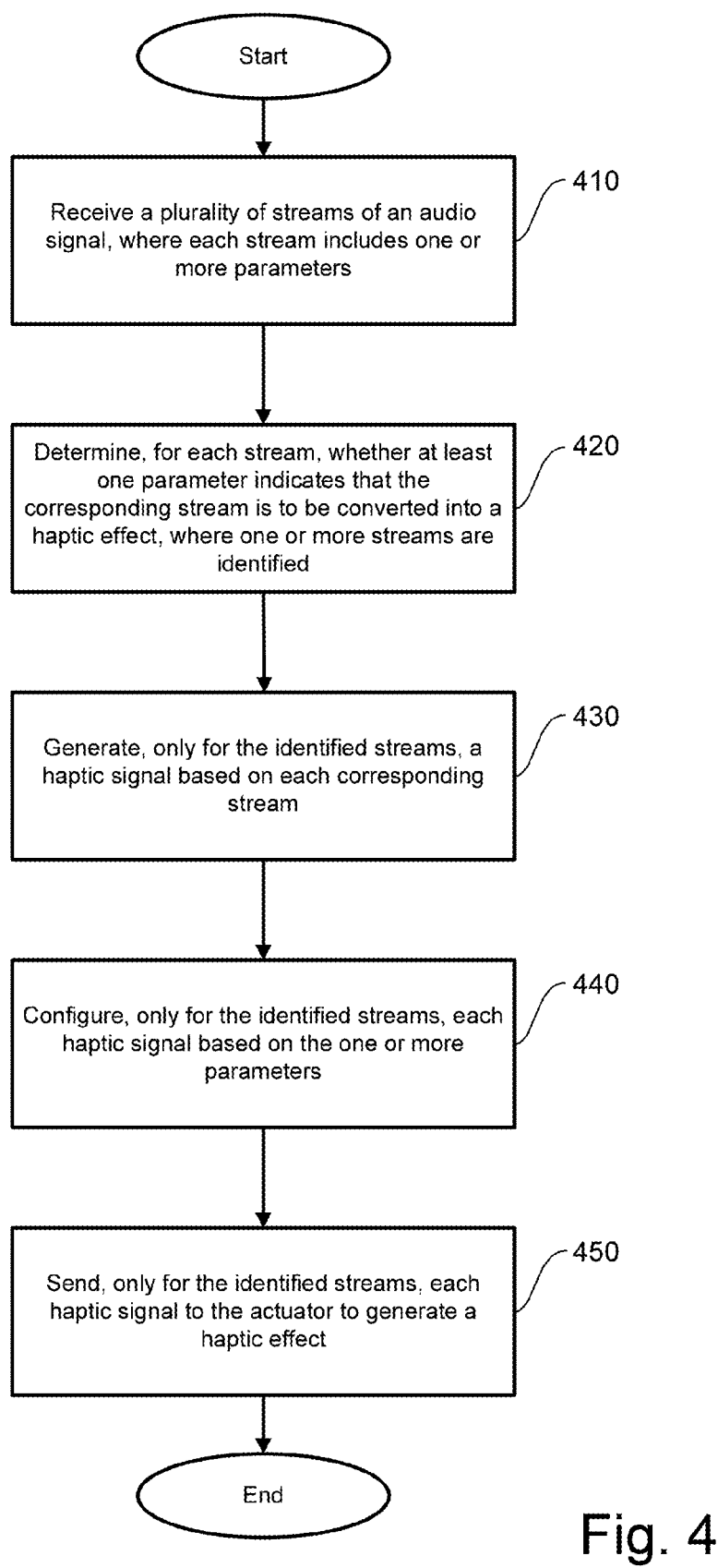
FIG. 4 illustrates a flow diagram of the functionality of a stream-independent haptic conversion module, according to one embodiment of the invention.

FIG. 4 illustrates a flow diagram of the functionality of a stream-independent haptic conversion module (such as stream-independent haptic conversion module 16 of FIG. 1), according to one embodiment of the invention. In one embodiment, the functionality of FIG. 4 is implemented by software stored in memory or another computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, the functionality may be performed by hardware using analog components.

The flow begins and proceeds to 410. At 410, a plurality of streams of an audio signal is received, where each stream includes one or more parameters. In certain embodiments, the one or more parameters can include a haptic conversion indication parameter, where the haptic conversion indication parameter can indicate whether the stream is to be converted into a haptic effect. In some of these embodiments, the one or more parameters can further include one or more haptic parameters. The one or more haptic parameters can be used to configure a haptic signal that is generated based on the stream, and thus, can be used to configure the haptic effect that is generated based on the stream. In some of these embodiments, the one or more haptic parameters can include at least one of a strength parameter (which can be used to configure a strength of a haptic signal), a density parameter (which can be used to configure a density of a haptic signal), a magnitude parameter (which can be used to configure a magnitude of a haptic signal), a frequency parameter (which can be used to configure a frequency of a haptic signal), an actuator parameter (which can be used to configure a haptic signal to be sent to one or more specified actuators), or a fail-safe parameter (which can be used to indicate a fail-safe operation to be executed in the case of one or more invalid parameters). The flow proceeds to 420.

At 420, it is determined, for each stream of the plurality of streams, whether at least one parameter of the one or more parameters indicates that the corresponding stream is to be converted into a haptic effect. Therefore, according to the embodiment, one or more streams that include at least one parameter that indicates the corresponding stream is to be converted into the haptic effect are identified. The flow proceeds to 430.

At 430, for only the identified streams, a haptic signal is generated based on each corresponding stream. The flow proceeds to 440.

At 440, for only the identified streams, each haptic signal is configured based on the one or more parameters, where the one or more parameters includes one or more haptic parameters. The configuring of each haptic signal can include configuring one or more characteristics of each haptic signal based on the one or more haptic parameters. In embodiments where one of the one or more haptic parameters is a strength parameter, the configuring of each haptic signal can include configuring a strength of each haptic signal. In embodiments where one of the one or more haptic parameters is a density parameter, the configuring of each haptic signal can include configuring a density of each haptic signal. In embodiments where one of the one or more haptic parameters is a magnitude parameter, the configuring of each haptic signal can include configuring a magnitude of each haptic signal. In embodiments where one of the one or more haptic parameters is a frequency parameter, the configuring of each haptic signal can include configuring a frequency of each haptic signal. In embodiments where one of the one or more haptic parameters is an actuator parameter, the configuring of each haptic signal can include configuring each haptic signal to be sent to one or more specific actuators. In embodiments where one of the one or more haptic parameters is a fail-safe parameter, the configuring of each haptic signal can include executing a fail-safe operation indicated by the fail-safe parameter in the case of one or more invalid parameters. In certain embodiments, the configuring of each haptic signal performed at 440 can be performed before the generating of each haptic signal performed at 430. In other embodiments, the configuring of each signal performed at 440 can be performed during the generating of each haptic signal performed at 430. In other embodiments, the configuring of each signal performed at 440 can be performed after the generating of each haptic signal performed at 430. The flow proceeds to 450.

At 450, for only the identified streams, each haptic signal is sent to the actuator to generate a haptic effect. In certain embodiments, for all streams, each stream is also sent to a speaker to generate an audio effect regardless of whether the haptic conversion indication parameter of the stream indicates that the stream is to be converted into the haptic effect. The flow then ends.

In certain embodiments, the audio signal is PCM audio signal, where each stream of the PCM audio signal is a PCM audio stream. In other embodiments, the audio signal is a MIDI audio signal, where each stream of the MIDI audio signal is a MIDI audio stream. In yet other embodiments, the audio signal is an MP3 audio signal, where each stream of the MP3 audio signal is an MP3 audio stream.

Thus, a haptic conversion system can be provided that applies an audio-to-haptic conversion for individual audio streams of an audio signal on a stream-by-stream basis. Such a haptic conversion system can allow a haptic effect developer to have more control over developing and designing a haptic experience for a user by allowing an audio-to-haptic conversion to be applied at a customizable level of granularity. Further, the haptic conversion system can provide a mechanism for haptic effect developers to be able to allow users to control which audio streams should produce haptic signals. Thus, customized haptic signals, which can be enabled or disabled for individual audio streams, can be produced from audio signals based on user preference, where the haptic signals can be used to generate haptic effects.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to convert one or more streams of an audio signal into one or more haptic effects, the converting comprising:

receiving a plurality of streams of the audio signal, wherein each stream comprises a plurality of parameters, and wherein the plurality of parameters comprise a haptic conversion indication parameter that indicates whether the corresponding stream is to be converted into a haptic effect and one or more haptic parameters that configure a haptic signal that is generated based on the stream;

determining, for each stream, whether the haptic conversion indication parameter indicates that the corresponding stream is to be converted into a haptic effect;

identifying one or more streams that include the haptic conversion indication parameter that indicates the corresponding stream is to be converted into the haptic effect, wherein a number of the one or more identified streams is less than a number of the plurality of streams;

generating one or more haptic signals based on the one or more identified streams; and sending the one or more haptic signals to an actuator to generate one or more haptic effects.

2. The non-transitory computer-readable medium of claim 1, the converting further comprising configuring at least one haptic signal based on the one or more haptic parameters.

3. The non-transitory computer-readable medium of claim 2, wherein the one or more haptic parameters comprise at least one of a strength parameter, a density parameter, a magnitude parameter, a frequency parameter, an actuator parameter, or a fail-safe parameter; and the configuring further comprising at least one of: configuring a strength of the at least one haptic signal, configuring a density of the at least one haptic signal, configuring a magnitude of the at least one haptic signal, configuring a frequency of the at least one haptic signal, configuring one or more specific actuators that the at least one haptic signal is sent to, or executing a fail-safe operation.

4. The non-transitory computer-readable medium of claim 2, wherein the configuring the at least one haptic signal is performed before the generating of the at least one haptic signal.

5. The non-transitory computer-readable medium of claim 2, wherein the configuring the at least one haptic signal is performed during the generating of the one or more haptic signals.

6. The non-transitory computer-readable medium of claim 2, wherein the configuring the at least one haptic signal is performed after the generating of the one or more haptic signals.

7. The non-transitory computer-readable medium of claim 1, wherein the audio signal is a pulse-code modulation audio buffer, and the stream is a pulse-code modulation stream.

8. The non-transitory computer-readable medium of claim 1, the converting further comprising sending a stream of the audio signal to a speaker to generate an audio effect regardless of whether the haptic conversion indicator parameter indicates that the stream is to be converted into the haptic effect.

9. A computer-implemented method for converting a plurality of streams of an audio signal into one or more haptic effects, the computer-implemented method comprising:

receiving a plurality of streams of the audio signal, wherein each stream comprises a plurality of parameters, and wherein the plurality of parameters comprise a haptic conversion indication parameter that indicates whether the corresponding stream is to be converted into a haptic effect and one or more haptic parameters that configure a haptic signal that is generated based on the stream;

determining, by a processor and for each stream, whether the haptic conversion indication parameter indicates that the corresponding stream is to be converted into a haptic effect;

identifying, by the processor, one or more streams that include the haptic conversion indication parameter that indicates the corresponding stream is to be converted into the haptic effect, wherein a number of the one or more identified streams is less than a number of the plurality of streams;

generating, by the processor, one or more haptic signals based on the one or more identified streams; and sending the one or more haptic signals to an actuator to generate one or more haptic effects.

10. The computer-implemented method of claim 9, further comprising configuring at least one haptic signal based on the one or more haptic parameters.

11. The computer-implemented method of claim 10, wherein the one or more haptic parameters comprise at least one of a strength parameter, a density parameter, a magnitude parameter, a frequency parameter, an actuator parameter, or a fail-safe parameter; and the configuring further comprising at least one of: configuring a strength of the at least one haptic signal, configuring a density of the at least one haptic signal, configuring a magnitude of the at least one haptic signal, configuring a frequency of the at least one haptic signal, configuring one or more specific actuators that the at least one haptic signal is sent to, or executing a fail-safe operation.

12. The computer-implemented method of claim 10, wherein the configuring the at least one haptic signal is performed before the generating of the one or more haptic signals.

13. The computer-implemented method of claim 10, wherein the configuring the at least one haptic signal is performed during the generating of the one or more haptic signals.

14. The computer-implemented method of claim 10, wherein the configuring the at least one haptic signal is performed after the generating of the one or more haptic signals.

15. The computer-implemented method of claim 9, wherein the audio signal is a pulse-code modulation audio buffer, and the stream is a pulse-code modulation stream.

16. The computer-implemented method of claim 9, further comprising sending a stream of the audio signal to a speaker to generate an audio effect regardless of whether the haptic conversion indicator parameter indicates that the stream is to be converted into the haptic effect.

17. A haptic conversion system comprising:

a memory configured to store a stream-independent haptic conversion module;

a processor configured to execute the stream-independent haptic conversion module stored on the memory; and an actuator configured to output one or more haptic effects;

wherein the stream-independent haptic conversion module is configured to:

receive a plurality of streams of an audio signal, wherein each stream comprises a plurality of parameters, and wherein the plurality of parameters comprise a haptic conversion indication parameter that indicates whether the corresponding stream is to be converted into a haptic effect and one or more haptic parameters that configure a haptic signal that is generated based on the stream;

determine, for each stream, whether the haptic conversion indication parameter indicates that the corresponding stream is to be converted into a haptic effect;

identify one or more streams that include the haptic conversion indication parameter that indicates the corresponding stream is to be converted into the haptic effect, wherein a number of the one or more identified streams is less than a number of the plurality of streams;

generate one or more haptic signals based on the one or more identified streams; and send the one or more haptic signals to the actuator to generate one or more haptic effects.

18. The haptic conversion system of claim 17, wherein the stream-independent haptic conversion module is further configured to configure at least one haptic signal based on the one or more haptic parameters.

19. The haptic conversion system of claim 18, wherein the one or more haptic parameters comprise at least one of a strength parameter, a density parameter, a magnitude parameter, a frequency parameter, an actuator parameter, or a fail-safe parameter; and wherein the stream-independent haptic conversion module is further configured to perform at least one of: configuring a strength of the at least one haptic signal, configuring a density of the at least one haptic signal, configuring a magnitude of the at least one haptic signal, configuring a frequency of the at least one haptic signal, configuring one or more specific actuators that the at least one haptic signal is sent to, or executing a fail-safe operation.

20. The haptic conversion system of claim 18, wherein the stream-independent haptic conversion module is further configured to configure the at least one haptic signal before it generates the one or more haptic signals.

21. The haptic conversion system of claim 18, wherein the stream-independent haptic conversion module is further configured to configure the at least one haptic signal while it generates the one or more haptic signals.

22. The haptic conversion system of claim 18, wherein the stream-independent haptic conversion module is further configured to configure the at least one haptic signal after it generates the one or more haptic signals.

23. The haptic conversion system of claim 17, wherein the audio signal is a pulse-code modulation audio buffer, and the stream is a pulse-code modulation stream.

* * * * *